(12) United States Patent
Song et al.

(10) Patent No.: US 10,732,443 B2
(45) Date of Patent: Aug. 4, 2020

(54) DISPLAY DEVICE HAVING A SHUTTER PANEL AND METHOD OF OPERATING THE SAME

(71) Applicant: SAMSUNG DISPLAY CO., LTD., Yongin-si, Gyeonggi-Do (KR)

(72) Inventors: Myoungseop Song, Cheonan-si (KR); Myungho Lee, Anyang-si (KR)

(73) Assignee: SAMSUNG DISPLAY CO., LTD., Yongin-si, Gyeonggi-Do (KR)

(*) Notice: Subject to any disclaimer, the term of this patent is extended or adjusted under 35 U.S.C. 154(b) by 26 days.

(21) Appl. No.: 16/235,394

(22) Filed: Dec. 28, 2018

(65) Prior Publication Data

US 2019/0204642 A1 Jul. 4, 2019

(30) Foreign Application Priority Data

Jan. 2, 2018 (KR) .................. 10-2018-0000387

(51) Int. Cl.
| | |
|---|---|
| G02F 1/133 | (2006.01) |
| H04N 5/06 | (2006.01) |
| G02F 1/1335 | (2006.01) |
| G09G 3/36 | (2006.01) |
| G09G 3/34 | (2006.01) |
| G02F 1/1347 | (2006.01) |

(52) U.S. Cl.
CPC ........ *G02F 1/13306* (2013.01); *G02F 1/1347* (2013.01); *G02F 1/133528* (2013.01); *G09G 3/34* (2013.01); *G09G 3/36* (2013.01); *G09G 3/3611* (2013.01); *G09G 3/3648* (2013.01); *H04N 5/06* (2013.01); *G09G 2300/023* (2013.01); *G09G 2310/0264* (2013.01); *G09G 2330/021* (2013.01); *G09G 2340/16* (2013.01)

(58) Field of Classification Search
CPC ...... G09G 3/36–3696; G09G 2300/026; G02F 1/13–1358; G02F 1/136–1418
See application file for complete search history.

(56) References Cited

U.S. PATENT DOCUMENTS

| | | | |
|---|---|---|---|
| 6,842,170 B1 | 1/2005 | Akins et al. | |
| 8,403,487 B2 * | 3/2013 | Lee | G02B 30/27 353/7 |
| 9,934,755 B2 * | 4/2018 | Roh | G02B 27/0101 |

(Continued)

FOREIGN PATENT DOCUMENTS

| | | |
|---|---|---|
| JP | 2000-310949 | 11/2000 |
| JP | 4593650 | 12/2010 |
| KR | 10-0869673 | 11/2008 |

*Primary Examiner* — Gene W Lee
(74) *Attorney, Agent, or Firm* — F. Chau & Associates, LLC (57) ABSTRACT

A display device includes a display panel including a plurality of pixels, a first driving circuit configured to operate to display an image through the plurality of pixels, and a shutter panel including a plurality of shutter pixels and configured to be periodically refreshed. The first driving circuit is operated to display a second image corresponding to a second image signal through the display panel when a difference in brightness between a first image signal of a present frame and the second image signal of a previous frame is greater than a predetermined level and to display a first image corresponding to the first image signal through the display panel when the shutter panel is refreshed.

20 Claims, 9 Drawing Sheets

(56) References Cited

U.S. PATENT DOCUMENTS

| | | | |
|---|---|---|---|
| 2005/0206582 A1* | 9/2005 | Bell | G09G 3/003 |
| | | | 345/6 |
| 2009/0002268 A1 | 1/2009 | Ueta et al. | |
| 2014/0028813 A1* | 1/2014 | Hamagishi | H04N 13/315 |
| | | | 348/54 |
| 2017/0053610 A1* | 2/2017 | Yang | G09G 3/3648 |
| 2017/0221427 A1* | 8/2017 | Seetzen | G09G 3/2003 |
| 2018/0052365 A1* | 2/2018 | Bae | G02F 1/133377 |

* cited by examiner

DISPLAY DEVICE HAVING A SHUTTER PANEL AND METHOD OF OPERATING THE SAME

CROSS-REFERENCE TO RELATED APPLICATION

This U.S. non-provisional patent application claims priority under 35 U.S.C. § 119 to Korean Patent Application No. 10-2018-0000387, filed on Jan. 2, 2018 in the Korean Intellectual Property Office, the disclosure of which is incorporated by reference herein in its entirety.

TECHNICAL FIELD

Exemplary embodiments of the inventive concept relate to a display device having a shutter panel and a method of operating the display device.

DISCUSSION OF RELATED ART

Display devices are frequently mounted on various electronic devices as user interfaces, and flat panel display devices are widely used because of their thinness, light weight, small size, low power consumption, etc.

A liquid crystal display device is a light receiving device that controls an amount of light incident thereto to display an image, and requires a separate light source, e.g., a backlight unit including a backlight lamp, to supply the light to a liquid crystal panel of the liquid crystal display device.

Light emitting diodes having a low power, eco-friendly, and slim design may be used as the light source. However, there may be a difficulty in optical designing that maintains brightness and color uniformity over the entire display area of the display device, and advanced techniques may be required for instantaneous control of a current flowing through the light emitting diode for a color combination.

Meanwhile, since the backlight unit of the liquid crystal display device supplies light to the entire display area of the liquid crystal display panel with the same amount regardless of grayscales corresponding to data signals, a contrast ratio of the image is determined by a contrast ratio characteristic (e.g., a light transmitting and blocking function) of the liquid crystal panel. As a result, there is a limit in improving the contrast ratio.

SUMMARY

According to an exemplary embodiment of the inventive concept, a display device includes a display panel including a plurality of pixels, a first driving circuit operated to display an image through the plurality of pixels, and a shutter panel including a plurality of shutter pixels and periodically refreshed. The first driving circuit is operated to display a second image corresponding to a second image signal through the display panel when a difference in brightness between a first image signal of a present frame and the second image signal of a previous frame is greater than a predetermined level and to display a first image corresponding to the first image signal through the display panel when the shutter panel is refreshed.

The first driving circuit includes a memory that stores the first image signal of the present frame from an outside and outputs the second image signal of the previous frame.

The first driving circuit further includes a first controller receiving the first image signal of the present frame and a control signal, and comparing the first image signal with the second image signal of the previous frame from the memory to output a data signal, a first control signal, and a first start signal, a first source driver outputting a data driving signal in response to the data signal and the first control signal, and a first gate driver sequentially selecting the plurality of pixels in response to the first start signal.

The first controller includes an image signal processing circuit that converts the second image signal from the memory to the data signal when the difference in brightness between the first image signal of the present frame and the second image signal of the previous frame is greater than the predetermined level, and converts the first image signal of the present frame to the data signal when the shutter panel is refreshed.

The display device further includes a second driving circuit that receives the first image signal and the control signal, and outputs a second start signal to drive the shutter pixels. When the difference in brightness between the first image signal of the present frame and the second image signal of the previous frame is greater than the predetermined level, the image signal processing circuit converts the second image signal from the memory to the data signal. The image signal processing circuit converts the first image signal of the present frame to the data signal in synchronization with the second start signal.

The second start signal has a frequency lower than a frequency of the first start signal.

The second driving circuit further includes a second controller receiving the first image signal and the control signal and outputting a second control signal and the second start signal, a second source driver outputting a shutter data signal to the plurality of shutter pixels in response to the second control signal, and a second gate driver sequentially selecting the plurality of shutter pixels in response to the second start signal.

The number of the plurality of shutter pixels of the shutter panel is smaller than the number of the plurality of pixels of the display panel.

The display panel includes a first substrate including a plurality of pixel areas respectively corresponding to the pixels, a second substrate spaced apart from and parallel to the first substrate and including the plurality of pixel areas, a liquid crystal layer disposed between the first substrate and the second substrate, a first polarizer disposed on a lower surface of the first substrate, where the first substrate is between the first polarizer and the second substrate, and a second polarizer disposed on an upper surface of the second substrate, where the second substrate is between the second polarizer and the first substrate.

The shutter panel includes a third substrate, a fourth substrate spaced apart from and parallel to the third substrate, a shutter liquid crystal layer disposed between the third substrate and the fourth substrate, and a third polarizer disposed on a lower surface of the fourth substrate, where the fourth substrate is between the third polarizer and the third substrate.

The shutter panel further includes an adhesive layer adhered to the first substrate of the display panel.

The display device further includes a first electrode and a second electrode, and the first and second electrodes are disposed between the fourth substrate of the shutter panel and the shutter liquid crystal layer.

The display device further includes a backlight unit to supply a light to the display panel.

According to an exemplary embodiment of the inventive concept, a display device includes a display panel including a plurality of pixels, a first driving circuit receiving a first image signal of a present frame and a control signal and controlling an image to be displayed through the plurality of pixels, and a shutter panel including a plurality of shutter pixels and periodically refreshed. The first driving circuit controls the shutter panel to be refreshed when a difference in brightness between the first image signal of the present frame and a second image signal of a previous frame is greater than a predetermined level.

The first driving circuit includes a memory that stores the first image signal of the present frame and outputs the second image signal of the previous frame.

The display device further includes a second driving circuit that receives the first image signal and the control signal and outputs a second start signal to drive the plurality of shutter pixels. When the difference in brightness between the first image signal of the present frame and the second image signal of the previous frame is greater than the predetermined level, the first driving circuit activates a start conversion signal. The second driving circuit activates the second start signal in response to the start conversion signal.

The display device further includes a backlight unit to supply a light to the display panel.

According to an exemplary embodiment of the inventive concept, in a method of operating a display device including a first driving circuit for controlling a display panel and a second driving circuit for controlling a shutter panel, the method includes receiving, by the first driving circuit, a first image signal of a present frame, storing, by the first driving circuit, the first image signal in a memory, comparing, by the first driving circuit, the first image signal with a second image signal of a previous frame from the memory, and outputting, by the first driving circuit, the second image signal as a data signal when a difference in brightness between the first image signal and the second image signal is greater than a predetermined level and the first image signal as the data signal when the shutter panel is refreshed.

The method further includes outputting the first image signal as the data signal when the difference in brightness between the first image signal and the second image signal is smaller than or equal to the predetermined level.

The second driving circuit receives the first image signal and a control signal and outputs a start signal to drive a plurality of shutter pixels, and outputting the data signal includes outputting the first image signal as the data signal in response to the second start signal when the difference in brightness between the first image signal and the second image signal is greater than the predetermined level.

BRIEF DESCRIPTION OF THE DRAWINGS

The above and other features of the inventive concept will become readily apparent by describing in detail exemplary embodiments thereof with reference to the accompanying drawings.

DETAILED DESCRIPTION OF THE EMBODIMENTS

Exemplary embodiments of the inventive concept provide a display device having an improved contrast ratio and display quality by selectively transmitting or blocking a light from a backlight unit by predetermined areas.

Exemplary embodiments of the inventive concept also provide a display device and a method of operating the display device, which are capable of preventing display quality from deteriorating due to a difference in operation frequency between a shutter panel and a display panel.

Hereinafter, exemplary embodiments of the inventive concept will be explained in detail with reference to the accompanying drawings. Like reference numerals may refer to like elements throughout this application.

Figure 1:
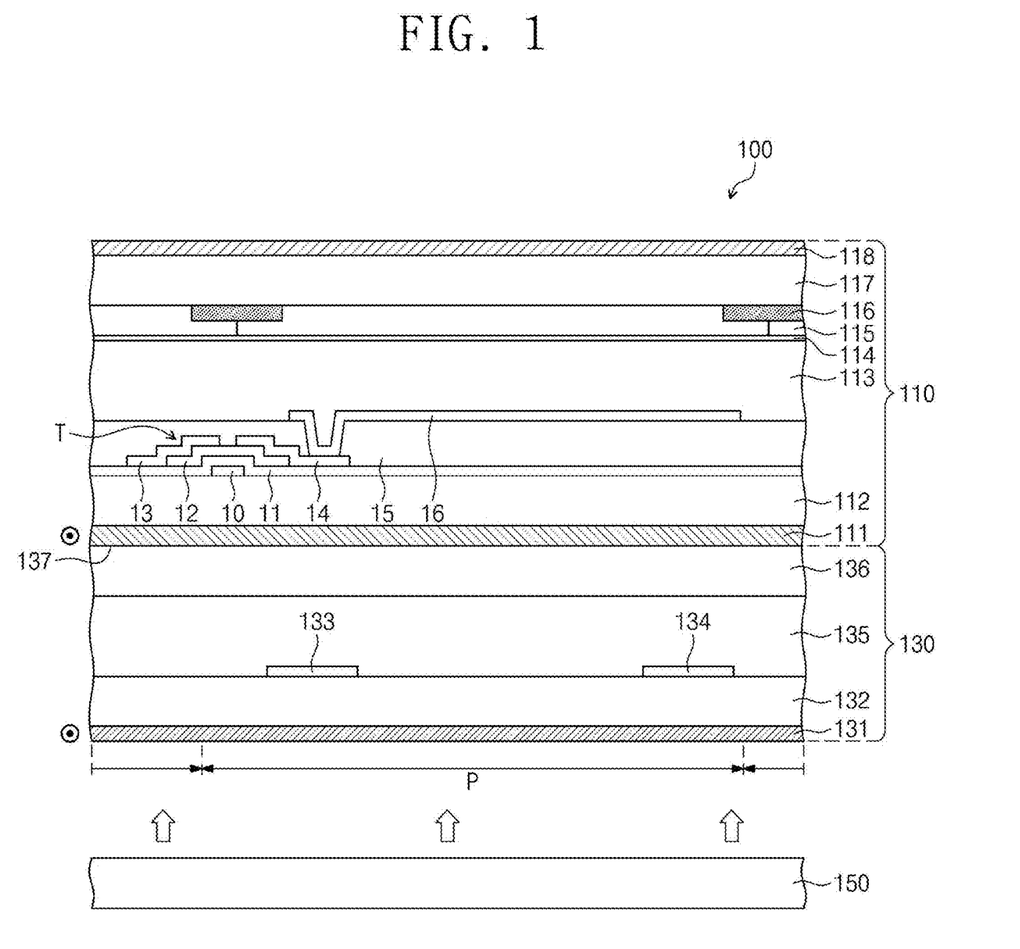
FIG. 1 is a cross-sectional view showing a display device according to an exemplary embodiment of the inventive concept.

FIG. 1 is a cross-sectional view showing a display device according to an exemplary embodiment of the inventive concept.

Referring to FIG. 1, a display device 100 includes a display panel 110, a shutter panel 130, and a backlight unit 150.

The display panel 110 includes a first substrate 112, a second substrate 117, which are spaced apart from and parallel with each other, and a liquid crystal layer 113 interposed between the first substrate 112 and the second substrate 117. The display panel 110 further includes a first polarizer 111 disposed on a lower surface of the first substrate 112 and a second polarizer 118 disposed on an upper surface of the second substrate 117.

An upper surface of the first substrate 112, which faces the second substrate 117, is divided into a plurality of pixel areas. A gate electrode 10 is disposed in each pixel area P, and a gate insulating layer 11 is disposed on the gate electrode 10. A semiconductor layer 12 is disposed on the gate insulating layer 11 to correspond to the gate electrode 10, and a source electrode 13 and a drain electrode 14, which are spaced apart from each other, are disposed on the semiconductor layer 12.

The gate electrode 10, the semiconductor layer 12, the source electrode 13, and the drain electrode 14 form a thin film transistor T.

A gate line and a data line are further disposed on the upper surface of the first substrate 112 to respectively transmit a gate signal and a data signal, and the gate line and the data line are respectively connected to the gate electrode 10 and the source electrode 13.

A protective layer 15 is disposed above the thin film transistor T, and a pixel electrode 16 is disposed on the protective layer 15 and connected to the drain electrode 14.

A black matrix 116 is disposed on a lower surface of the second substrate 117, which faces the first substrate 112, to correspond to a boundary of the pixel area P. A color filter layer 115 is disposed under the black matrix 116 to correspond to the pixel area P. A common electrode 114 is disposed under the color filter layer 115.

The liquid crystal layer 113 includes a plurality of liquid crystal molecules and is disposed between the pixel electrode 16 of the first substrate 112 and the common electrode 114 of the second substrate 117.

The shutter panel 130 includes a third substrate 136, and a fourth substrate 132, which are spaced apart from and parallel with each other, as well as a shutter liquid crystal layer 135 interposed between the third substrate 136 and the fourth substrate 132. A third polarizer 131 is disposed on a lower surface of the fourth substrate 132. A first electrode 133 and a second electrode 134 are disposed on an upper surface of the fourth substrate 132.

The shutter liquid crystal layer 135 includes shutter liquid crystal molecules and is disposed between a lower surface of the third substrate 136 and the first and second electrodes 133 and 134. The shutter liquid crystal layer 135 is also disposed between the lower surface of the third substrate 136 and the fourth substrate 132. The shutter liquid crystal molecules may be formed of positive or negative nematic liquid crystals and may be nematic liquid crystal molecules, ferroelectric liquid crystal molecules, or flexo electric liquid crystal molecules.

A shutter thin film transistor and shutter gate and data lines, which respectively transmit a shutter gate signal and a shutter data signal, may be disposed on an upper surface of the fourth substrate 132. The shutter gate line and the shutter data line may be connected to the shutter thin film transistor. The first electrode 133 may be connected to the shutter thin film transistor, and the second electrode 134 may be connected to a common voltage terminal.

The first and second polarizers 111 and 118 have transmission axes substantially perpendicular to each other, and the first and third polarizers 111 and 131 have transmission axes substantially parallel to each other.

The backlight unit 150 supplies the light to the display panel 110, and the shutter panel 130 blocks or transmits the light provided from the backlight unit 150 in each pixel area P.

Since the shutter panel 130 blocks or transmits the light, the color filter layer 115 may be omitted according to exemplary embodiments of the inventive concept. According to an exemplary embodiment of the inventive concept, the shutter panel 130 may not include the third substrate 136.

The display panel 110 is attached to the shutter panel 130 by an adhesive layer 137 disposed under the first polarizer 111 and above the third substrate 136.

An adhesive layer may be disposed over an entire surface between the first polarizer 111 and the first substrate 112, an entire surface between the second polarizer 118 and the second substrate 117, and an entire surface between the third polarizer 131 and the fourth substrate 132.

In the present exemplary embodiment, the display panel 110, which may be a twisted-nematic (TN) type display panel, in which the pixel electrode 16 and the common electrode 114 are respectively disposed on the first and second substrates 112 and 117, has been described as a representative example; however, the inventive concept is not limited thereto. According to an exemplary embodiment of the inventive concept, the display panel 110 may be a vertical alignment (VA) type or a horizontal electric field type in which the pixel electrode and the common electrode are disposed on the same substrate, e.g., an in-plane switching (IPS) type, a fringe field switching (FFS) type, etc.

In addition, in the present exemplary embodiment, the shutter panel 130 is an IPS type shutter panel as a representative example; however, the inventive concept is not limited thereto. According to an exemplary embodiment of the inventive concept, the shutter panel 130 may be the TN, VA, or FFS type. As an example, in case of the IPS or FFS type shutter panel 130 in which the pixel electrode and the common electrode are disposed on the same substrate, the shutter panel 130 is formed using one substrate, and thus, a thickness of the display device 100 may be reduced, and a manufacturing process of the display device 100 may be simplified.

In the display device 100, when the thin film transistor T is turned on in response to the gate signal applied to the gate electrode 10, the data signal is applied to the pixel electrode 16 through the thin film transistor T. In this case, an electric field is formed between the pixel electrode 16 and the common electrode 114, and liquid crystal molecules of the liquid crystal layer 113 are realigned along the electric field. Accordingly, the pixel area P of the display panel 110 may display a grayscale corresponding to the data signal.

When the shutter thin film transistor is turned on in response to the shutter gate signal, the shutter data signal is applied to the first electrode 133 through the shutter thin film transistor. In this case, a horizontal electric field is formed between the first electrode 133 and the second electrode 134, and the shutter liquid crystal molecules of the shutter liquid crystal layer 135 are realigned along the horizontal electric field. Accordingly, the pixel area P of the shutter panel 130 may block or transmit the light from the backlight unit 150.

In this case, a transmittance corresponding to the shutter data signal is allowed to be proportional to a transmittance corresponding to the data signal, and thus the contrast ratio and definition of the display device 100 may be improved.

As an example, when a data signal applied to a specific pixel area P of the display panel 110 corresponds to a high grayscale, the shutter data signal applied to the corresponding pixel area P of the shutter panel 130 may be allowed to correspond to a relatively high transmittance, and when the data signal applied to the specific pixel area P of the display panel 110 corresponds to a low grayscale, the shutter data signal applied to the corresponding pixel area P of the shutter panel 130 may be allowed to correspond to a relatively low transmittance.

Accordingly, the contrast ratio and the definition of the image displayed by the display device 100 may be improved by increasing an amount of the light supplied to the image having the high grayscale and displayed through each pixel area P to further increase the brightness, and by decreasing an amount of the light supplied to the image having the low grayscale and displayed through each pixel area P to further decrease the brightness.

FIG. 1 shows a structure in which the pixel area P of the display panel 110 corresponds to the pixel area P of the shutter panel 130 in a one-to-one correspondence (e.g., a resolution of the display panel 110 is equal to a resolution of the shutter panel 130) to control the brightness of the image displayed by the display panel 110 in each pixel area P; however, an area of the pixel area P of the shutter panel 130 may be wider than an area of the pixel area P of the display panel 110 (e.g., plural pixel areas of the display panel 110 correspond to one pixel area of the shutter panel 130). In other words, since the resolution of the shutter panel 130 is smaller than the resolution of the display panel 110, the brightness of the image displayed by the display panel 110 may be controlled by a block including the plural pixel areas.

In general, the brightness of the image signal is changed every several frames instead of being rapidly changed every frame. In particular, when the image is a still image, the image signal maintains substantially the same brightness for a long time. The display device 100 operates the display panel 110 and the shutter panel 130, and thus, power consumption of the display device 100 increases. Therefore, when an operation frequency of the shutter panel 130 is set to be lower than an operation frequency of the display panel 110, deterioration in quality of the display image is reduced and power consumption decreases.

Figure 2:
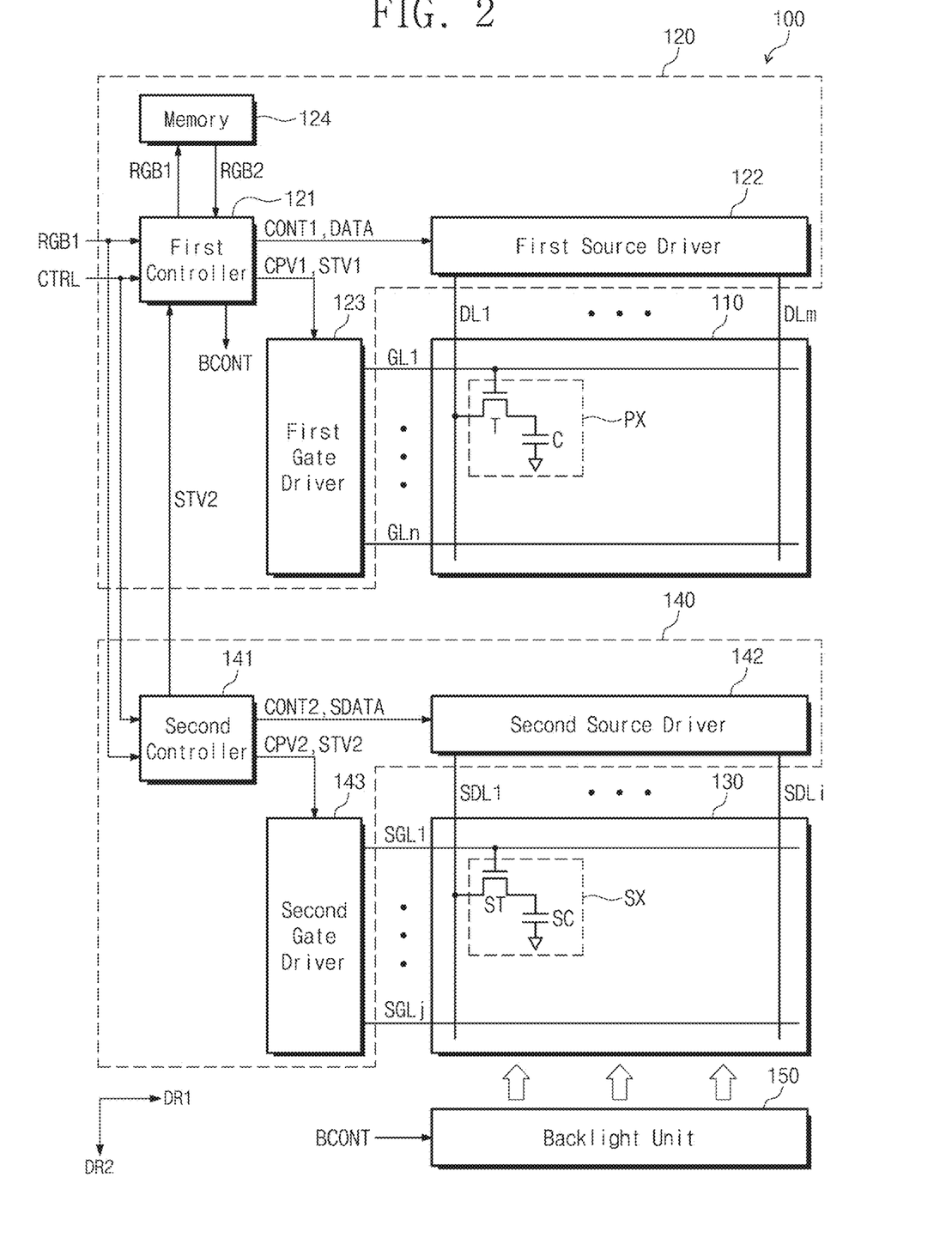
FIG. 2 is a block diagram showing a configuration of a display device according to an exemplary embodiment of the inventive concept.

FIG. 2 is a block diagram showing a configuration of the display device of FIG. 1 according to an exemplary embodiment of the inventive concept.

Referring to FIGS. 1 and 2, the display device 100 includes the display panel 110, a first driving circuit 120, the shutter panel 130, a second driving circuit 140, and the backlight unit 150.

The display panel 110 displays the image. In the present exemplary embodiment, a liquid crystal display panel will be described as the display panel 110, but the display panel 110 should not be limited to the liquid crystal display panel. In other words, the display panel 110 may be another type of display panel having the backlight unit 150.

The display panel 110 includes a plurality of gate lines GL1 to GLn extending in a first direction DR1, a plurality of data lines DL1 to DLm extending in a second direction DR2 that crosses the first direction DR1, and a plurality of pixels PX arranged in areas defined by the gate lines GL1 to GLn and the data lines DL1 to DLm crossing the gate lines GL1 to GLn. The data lines DL1 to DLm are insulated from the gate lines GL1 to GLn while crossing the gate lines GL1 to GLn. Each of the pixels PX includes the thin film transistor T and a liquid crystal capacitor C. Each of the pixels PX further includes a storage capacitor.

The pixels PX have substantially the same structure. Accordingly, a configuration of one pixel will be described as a representative example, and details of others will be omitted. The thin film transistor T of the pixel PX includes the gate electrode 10 connected to a first gate line GL1 among the gate lines GL1 to GLn, the source electrode 13 connected to a first data line DL1 among the data lines DL1 to DLm, and the drain electrode 14 connected to the pixel electrode 16 of the liquid crystal capacitor C. The pixel electrode 16 serves as one end of the liquid crystal capacitor C, and the common electrode 114 serves as the other end of the liquid crystal capacitor C.

The first driving circuit 120 includes a first controller 121, a first gate driver 123, a first source driver 122, and a memory 124. The first controller 121 receives a first image signal RGB1 and control signals CTRL from an external source. The control signals CTRL include, for example, a vertical synchronization signal, a horizontal synchronization signal, a main clock signal, a data enable signal, etc. Responsive to the control signals CTRL, the first controller 121 applies a data signal DATA, which is obtained by processing the first image signal RGB1 while taking into account an operating condition of the display panel 110, and a first control signal CONT1 to the first source driver 122, and applies a first gate pulse signal CPV1 and a first start signal STV1 to the first gate driver 123. The first control signal CONT1 includes a horizontal synchronization start signal, a clock signal, and a line latch signal. The first controller 121 may change and output the data signal DATA in various ways depending on an alignment of the pixels PX of the display panel 110 and a display frequency. The first controller 121 further outputs a backlight control signal BCONT to control the backlight unit 150.

The memory 124 stores the first image signal RGB1 of a present frame, which is provided from the first controller 121. The memory 124 may be a volatile memory, such as a random-access memory (RAM), a dynamic RAM (DRAM), a static RAM (SRAM), etc., and may be called a buffer memory.

The first controller 121 stores the first image signal RGB1 of the present frame in the memory 124 and receives a second image signal RGB2 of a previous frame from the memory 124. The first controller 121 outputs the second image signal RGB2 as the data signal DATA when a difference (e.g., a difference in brightness) between the first image signal RGB1 and the second image signal RGB2 is greater than a predetermined level and outputs the first image signal RGB1 of the present frame as the data signal DATA when the shutter panel 130 is refreshed, e.g., when a second start signal STV2 from the second driving circuit 140 is activated. The configuration and operation of the first controller 121 will be described in detail below.

The first gate driver 123 drives the gate lines GL1 to GLn in response to the first gate pulse signal CPV1 and the first start signal STV1 from the first controller 121. The first gate driver 123 includes a gate driving integrated circuit. The first gate driver 123 may be simultaneously formed with the pixels PX through a thin film process. For instance, the first gate driver 123 may be implemented in an oxide semiconductor TFT gate driver circuit (OSG) and mounted on one side portion of the display panel.

The first source driver 122 applies a data driving signal to the data lines DL1 to DLm in response to the data signal DATA and the first control signal CONT1.

The shutter panel 130 includes a plurality of shutter gate lines SGL1 to SGLj extending in the first direction DR1, a plurality of shutter data lines SDL1 to SDLi extending in the second direction DR2, and a plurality of shutter pixels SX arranged in areas defined by the shutter gate lines SGL1 to SGLj and the shutter data lines SDL1 to SDLi. The shutter data lines SDL1 to SDLi are insulated from the shutter gate lines SGL1 to SGLj while crossing the shutter gate lines SGL1 to SGLj. Each of the shutter pixels SX includes a shutter thin film transistor ST and a shutter liquid crystal capacitor SC. Each of the pixels SX further includes a shutter storage capacitor.

The shutter pixels SX have substantially the same structure. Accordingly, a configuration of one shutter pixel will be described as a representative example, and details of others will be omitted. The shutter thin film transistor ST of the shutter pixel SX includes a gate electrode connected to a first shutter gate line SGL1 among the shutter gate lines SGL1 to SGLj, a source electrode connected to a first shutter data line SDL1 among the shutter data lines SDL1 to SDLi, and a drain electrode connected to the first electrode 133 of the shutter liquid crystal capacitor SC. The first electrode 133 serves as one end of the shutter liquid crystal capacitor SC, and the second electrode 134 serves as the other end of the shutter liquid crystal capacitor SC.

The second driving circuit 140 includes a second controller 141, a second gate driver 143, and a second source driver 142. The second controller 141 receives the first image signal RGB1 and the controls signals CTRL from the external source. The control signals CTRL include, for example, the vertical synchronization signal, the horizontal synchronization signal, the main clock signal, and the data enable signal. Responsive to the control signals CTRL, the second controller 141 applies a shutter data signal SDATA, which is obtained by processing the first image signal RGB1 while taking into account an operating condition of the shutter panel 130, and a second control signal CONT2 to the second source driver 142 and applies a second gate pulse signal CPV2 and a second start signal STV2 to the second gate driver 143. The second control signal CONT2 includes the horizontal synchronization start signal, the clock signal, and the line latch signal. The second controller 141 may change and output the shutter data signal SDATA in various ways depending on the alignment of the shutter pixels SX of the shutter panel 130 and a display frequency.

The second gate driver 143 drives the shutter gate lines SGL1 to SGLj in response to the second gate pulse signal CPV2 and the second start signal STV2 from the second controller 141. The second gate driver 143 includes a gate driving integrated circuit. The second gate driver 143 may be simultaneously formed with the shutter pixels SX through a thin film process. For instance, the second gate driver 143 may be implemented in an oxide semiconductor TFT gate driver circuit (OSG) and mounted on one side portion of the shutter panel 130.

The second source driver 142 applies a shutter data driving signal to the shutter data lines SDL1 to SDLi in response to the shutter data signal SDATA and the second control signal CONT2.

In the present exemplary embodiment, the number of the shutter data lines SDL1 to SDLi is smaller than the number of the data lines DL1 to DLm (i<m), and the number of the shutter gate lines SGL1 to SGLj is smaller than the number of the gate lines GL1 to GLn (j<n). In this case, a size of the shutter pixel SX is greater than a size of the pixel PX (each of "i", "j", "m" and "n" is a natural number).

In the present exemplary embodiment, a frequency of the second start signal STV2 generated by the second controller 141 is lower than a frequency of the first start signal STV1 generated by the first controller 121. As an example, the frequency of the first start signal STV1 may be about 120 Hz, and the frequency of the second start signal STV2 may be about 60 Hz. As another example, the frequency of the first start signal STV1 may be about 240 Hz, and the frequency of the second start signal STV2 may be about 60 Hz.

The backlight unit 150 is arranged under the display panel 110 to face the pixels PX. The backlight unit 150 is operated in response to the backlight control signal BCONT from the first controller 121.

Figure 3:
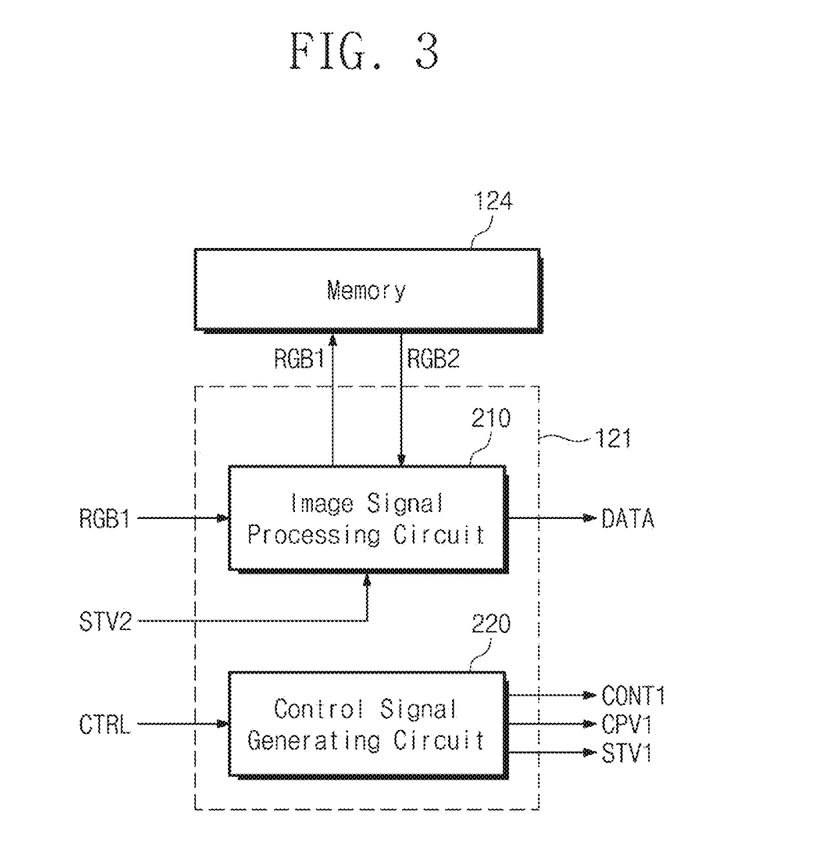
FIG. 3 is a block diagram showing a configuration of a first controller of FIG. 2 according to an exemplary embodiment of the inventive concept.

FIG. 3 is a block diagram showing a configuration of a first controller of FIG. 2 according to an exemplary embodiment of the inventive concept.

Referring to FIG. 3, the first controller 121 includes an image signal processing circuit 210 and a control signal generating circuit 220.

The image signal processing circuit 210 outputs the second image signal RGB2 as the data signal DATA when the difference between the first image signal RGB1 of the present frame, which is provided from the external source, and the second image signal RGB2 provided from the memory 124 is greater than the predetermined level, and the image signal processing circuit 210 outputs the first image signal RGB1 of the present frame as the data signal DATA in response to the second start signal STV2 from the second driving circuit 140 shown in FIG. 2.

The control signal generating circuit 220 outputs the first control signal CONT1, the first gate pulse signal CPV1, and the first start signal STV1 based on the control signals CTRL from the external source. The first control signal CONT1 includes the horizontal synchronization start signal, the clock signal, and the line latch signal.

Figure 4:
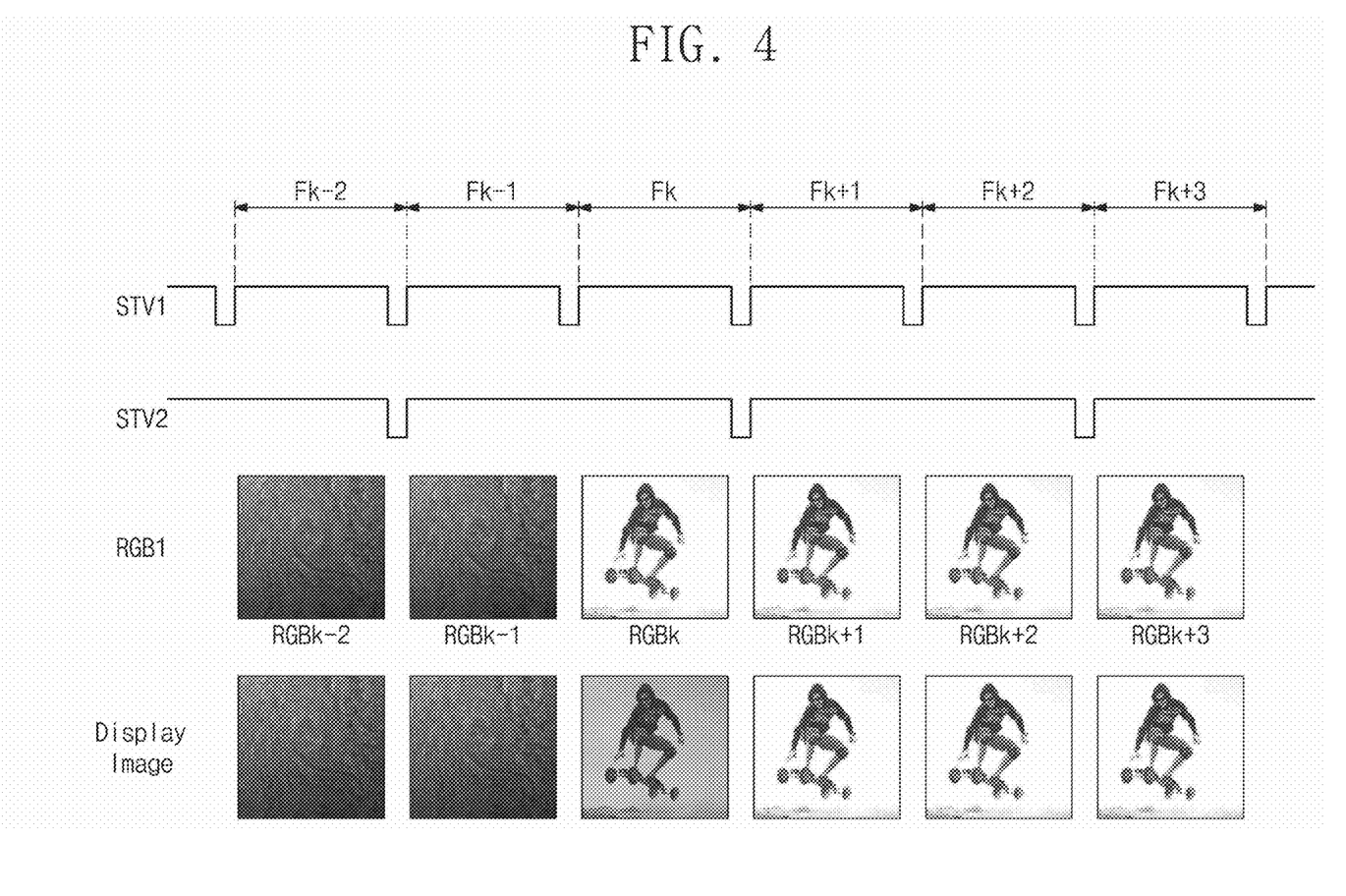
FIG. 4 is a view showing an operation of a display device according to an exemplary embodiment of the inventive concept.

FIG. 4 is a view showing an operation of the display device according to an exemplary embodiment of the inventive concept.

Referring to FIGS. 2 and 4, the first start signal STV1 generated by the first driving circuit 120 is a pulse signal that is transited every frame. The second start signal STV2 generated by the second driving circuit 140 is a pulse signal having a frequency lower than that of the first start signal STV1. For instance, when the frequency of the first start signal STV1 is about 120 Hz, the frequency of the second start signal STV2 is about 60 Hz. When the operation frequency of the shutter panel 130 is set to be lower than the operation frequency of the display panel 110, the deterioration in quality of the display image may be minimized and power consumption may decrease. In FIG. 4, image signals RGBk−2 through RGBk+3 of (k−2)th through (k+3)th frames Fk−2 through Fk+3, respectively, are illustrated.

When assuming that the difference in brightness between the image signal RGBk−1 of the (k−1)th frame Fk−1 and the image signal RGBk of the k-th frame Fk is large, the display panel 110 displays the image corresponding to the image signal RGBk of the k-th frame Fk, but the shutter panel 130 is operated to supply the light having the brightness corresponding to the image signal RGBk−1 of the (k−1)th frame Fk−1. Since the second start signal STV2 is activated every two frames, the shutter panel 130 supplies the light having the same brightness in the (k−1)th frame Fk−1 and the k-th frame Fk.

In a case that the image signal RGBk of the k-th frame Fk is substantially the same as the image signal RGBk+1 of the (k+1)th frame Fk+1, the shutter panel 130 changes the brightness of the light to be suitable for the image signal RGBk+1 of the (k+1)th frame Fk+1. In this case, although the image signal RGBk of the k-th frame Fk is substantially the same as the image signal RGBk+1 of the (k+1)th frame Fk+1, the brightness of the image displayed through the display panel 110 may become different.

Figure 5:
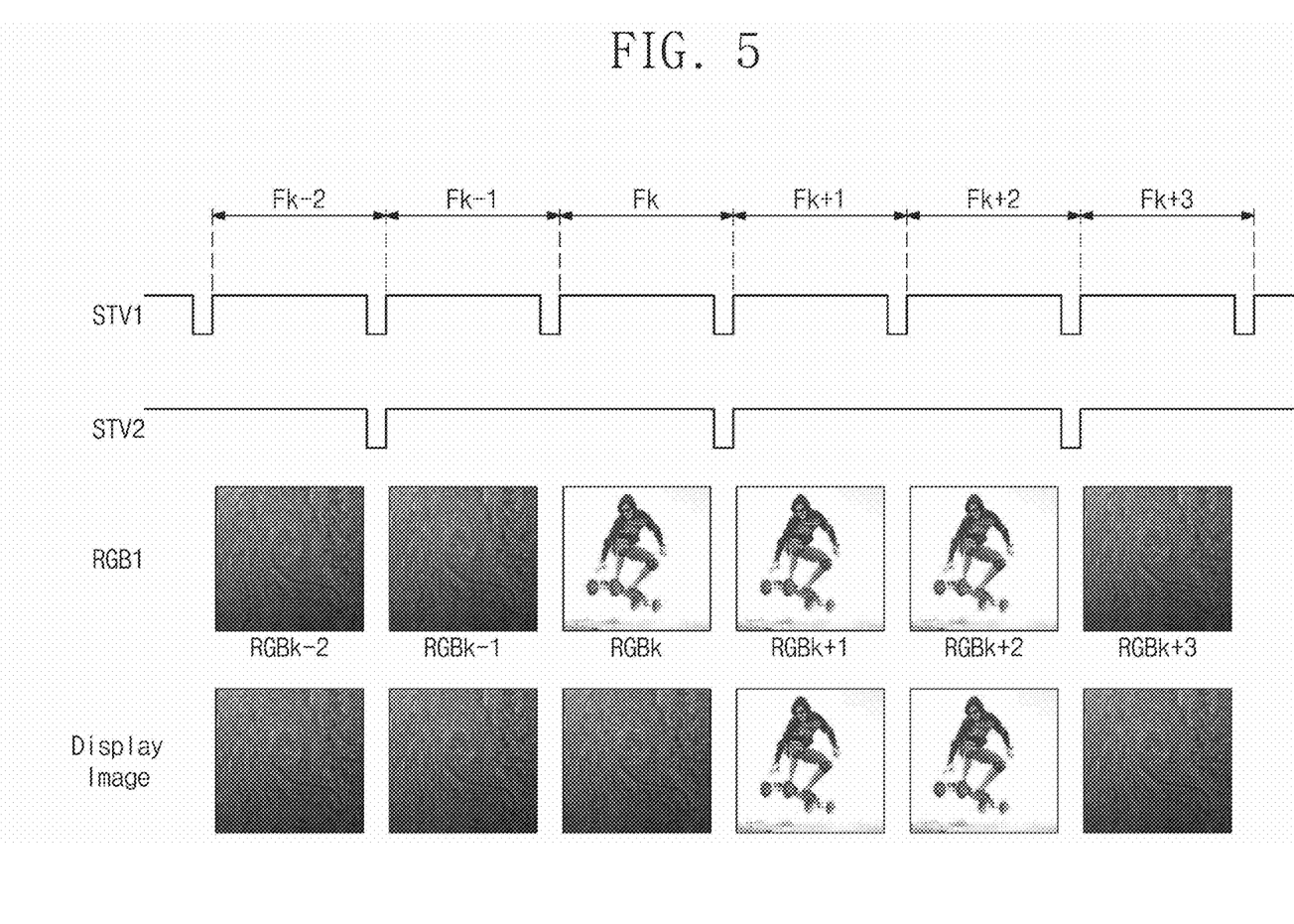
FIG. 5 is a view showing an operation of a display device according to an exemplary embodiment of the inventive concept.

FIG. 5 is a view showing an operation of a display device according to an exemplary embodiment of the inventive concept.

Referring to FIGS. 2 and 5, when the image signal RGBk−1 of the (k−1)th frame Fk−1 is received as the first image signal RGB1, the first controller 121 compares the image signal RGBk−1 of the (k−1)th frame Fk−1 with the second image signal RGB2 of the previous frame stored in the memory 124, e.g., the image signal RGBk−2 of the (k−2)th frame Fk−2. When a difference in brightness between the image signal RGBk−1 of the (k−1)th frame Fk−1 and the image signal RGBk−2 of the (k−2)th frame Fk−2 is smaller than or equal to a reference value, the first controller 121 converts the image signal RGBk−1 of the (k−1)th frame Fk−1 to the data signal DATA and outputs the data signal DATA. Meanwhile, the image signal RGBk−1 of the (k−1)th frame Fk−1 is stored in the memory 124.

When the image signal RGBk of the k-th frame Fk is received as the first image signal RGB1, the first controller 121 compares the image signal RGBk of the k-th frame Fk with the second image signal RGB2 of the previous frame stored in the memory 124, e.g., the image signal RGBk−1 of the (k−1)th frame Fk−1. When a difference in brightness between the image signal RGBk of the k-th frame Fk and the image signal RGBk−1 of the (k−1)th frame Fk−1 is greater than the reference value and the second start signal STV2 is in an inactive state, the first controller 121 converts the image signal RGBk−1 of the (k−1)th frame Fk−1 to the data signal DATA and outputs the data signal DATA. In other words, the image signal RGBk−1 of the (k−1)th frame Fk−1 is output twice.

Then, the first controller 121 converts the image signal RGBk+1 of the (k+1)th frame Fk+1 to the data signal DATA in response to the second start signal STV2 from the second driving circuit 140 and outputs the data signal DATA. In this case, the shutter panel 130 is operated to supply the light having the brightness corresponding to the image signal RGBk+1 of the (k+1)th frame Fk+1. Due to the above-described operation, the same images of two consecutive frames may be prevented from being displayed with different brightness.

When the image signal RGBk+3 of the (k+3)th frame Fk+3 is received as the first image signal RGB1, the first controller 121 compares the image signal RGBk+3 of the (k+3)th frame Fk+3 with the second image signal RGB2 of the previous frame stored in the memory 124, e.g., the image signal RGBk+2 of the (k+2)th frame Fk+2. Although a difference in brightness between the image signal RGBk+3 of the (k+3)th frame Fk+3 and the image signal RGB+2 of the (k+2)th frame Fk+2 is greater than the reference value, the first controller 121 converts the image signal RGBk+3 of the (k+3)th frame Fk+3 to the data signal DATA and outputs the data signal DATA when the second start signal STV2 is transited to the active state from the inactive state. This is because the light suitable for the image signal RGBk+3 of the (k+3)th frame Fk+3 may be provided through the shutter panel 130 when the second start signal STV2 from the second driving circuit 140 is transited to the active state from the inactive state.

Figure 6:
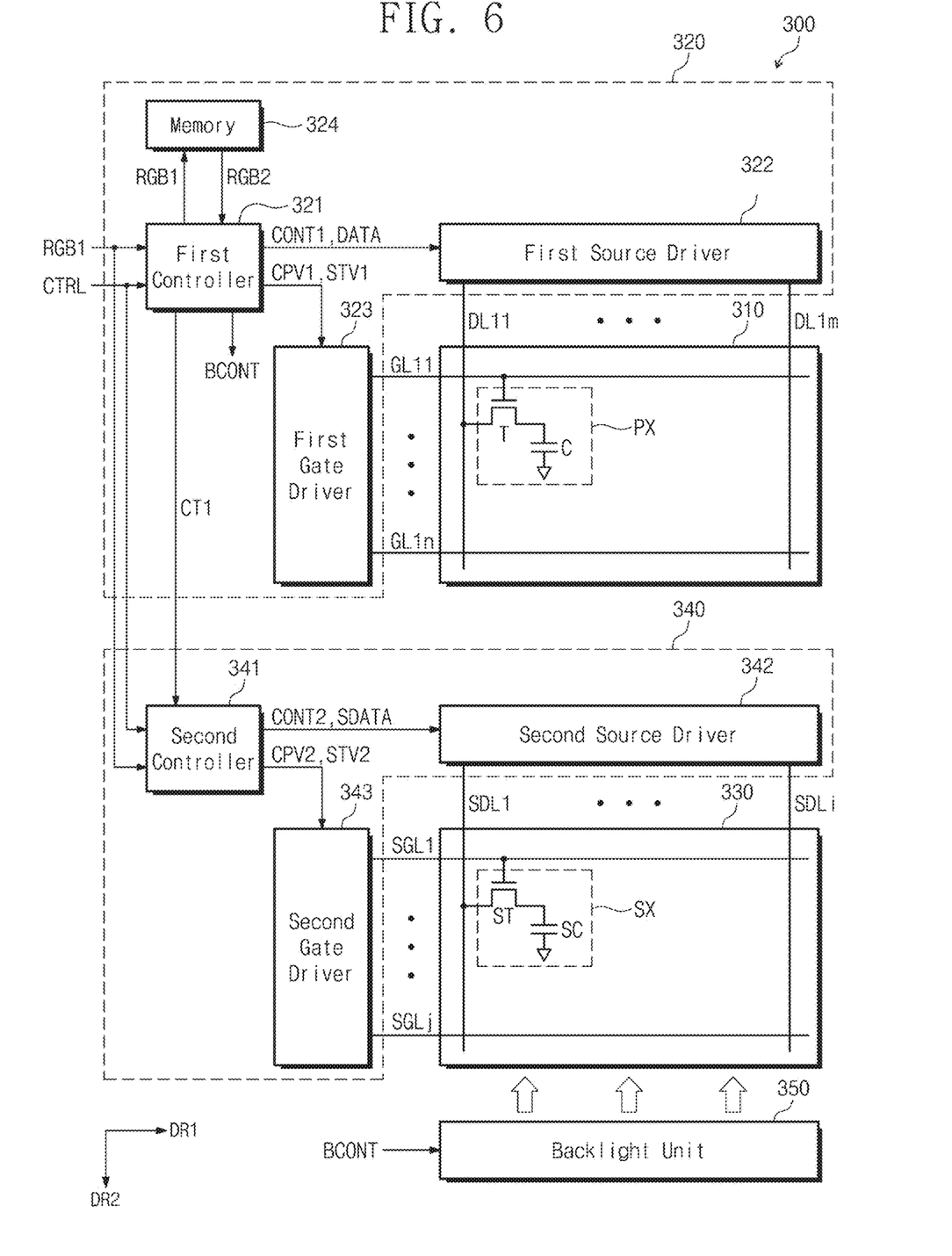
FIG. 6 is a block diagram showing a configuration of a display device according to an exemplary embodiment of the inventive concept.

FIG. 6 is a block diagram showing a configuration of a display device according to an exemplary embodiment of the inventive concept.

Referring to FIG. 6, a display device 300 includes a display panel 310, a first driving circuit 320, a shutter panel 330, a second driving circuit 340, and a backlight unit 350. The display device 300 shown in FIG. 6 has a similar configuration to that of the display device 100 shown in FIG. 1, and thus redundant descriptions are omitted.

A first controller 321 of the first driving circuit 320 stores the first image signal RGB1 of a present frame in a memory 324 and receives the second image signal RGB2 of a previous frame from the memory 324. The first controller 321 converts the first image signal RGB1 of the present frame to the data signal DATA. The first controller 321 activates a start conversion signal CT1 at a first level (e.g., a high level) and applies the start conversion signal CT1 to the second driving circuit 340 when a difference in brightness between the first image signal RGB1 and the second image signal RGB2 is greater than a reference value.

A second controller 341 of the second driving circuit 340 receives the first image signal RGB1, the control signals CTRL, and the start conversion signal CT1 and outputs the shutter data signal SDATA, the second control signal CONT2, the second gate pulse signal CPV2, and the second start signal STV2. The second controller 341 outputs the second start signal STV2 that is activated when the start conversion signal CT1 from the first controller 321 is activated at the first level.

In the present exemplary embodiment, a frequency of the second start signal STV2 generated by the second controller 341 is lower than a frequency of the first start signal STV1 generated by the first controller 321 during a normal mode. As an example, the frequency of the first start signal STV1 may be about 120 Hz, and the frequency of the second start signal STV2 may be about 60 Hz. As another example, the frequency of the first start signal STV1 may be about 240 Hz, and the frequency of the second start signal STV2 may be about 60 Hz. When the start conversion signal CT1 from the first controller 321 is activated at the first level, the second controller 341 may change a time point at which the second start signal STV2 is activated.

Figure 7:
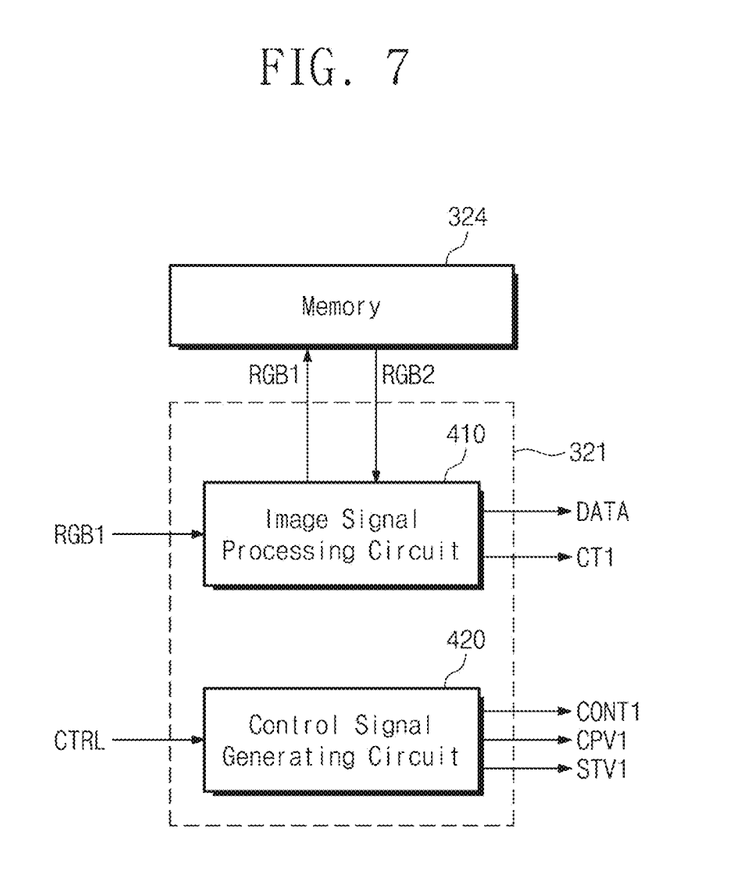
FIG. 7 is a block diagram showing a configuration of a first controller of FIG. 6 according to an exemplary embodiment of the inventive concept.

FIG. 7 is a block diagram showing a configuration of a first controller of FIG. 6 according to an exemplary embodiment of the inventive concept.

Referring to FIG. 7, the first controller 321 includes an image signal processing circuit 410 and a control signal generating circuit 420.

The image signal processing circuit 410 converts the first image signal RGB1 of the present frame provided from the external source to the data signal DATA and stores the first image signal RGB1. The image signal processing circuit 410 outputs the start conversion signal CT1 at the first level (e.g., the high level), which is activated when the difference in brightness between the first image signal RGB1 and the second image signal RGB2 from the memory 324 is greater than the reference value.

The control signal generating circuit 420 outputs the first control signal CONT1, the first gate pulse signal CPV1, and the first start signal STV1 based on the control signals CTRL from the external source. The first control signal CONT1 includes the vertical synchronization start signal, the clock signal, and the line latch signal.

Figure 8:
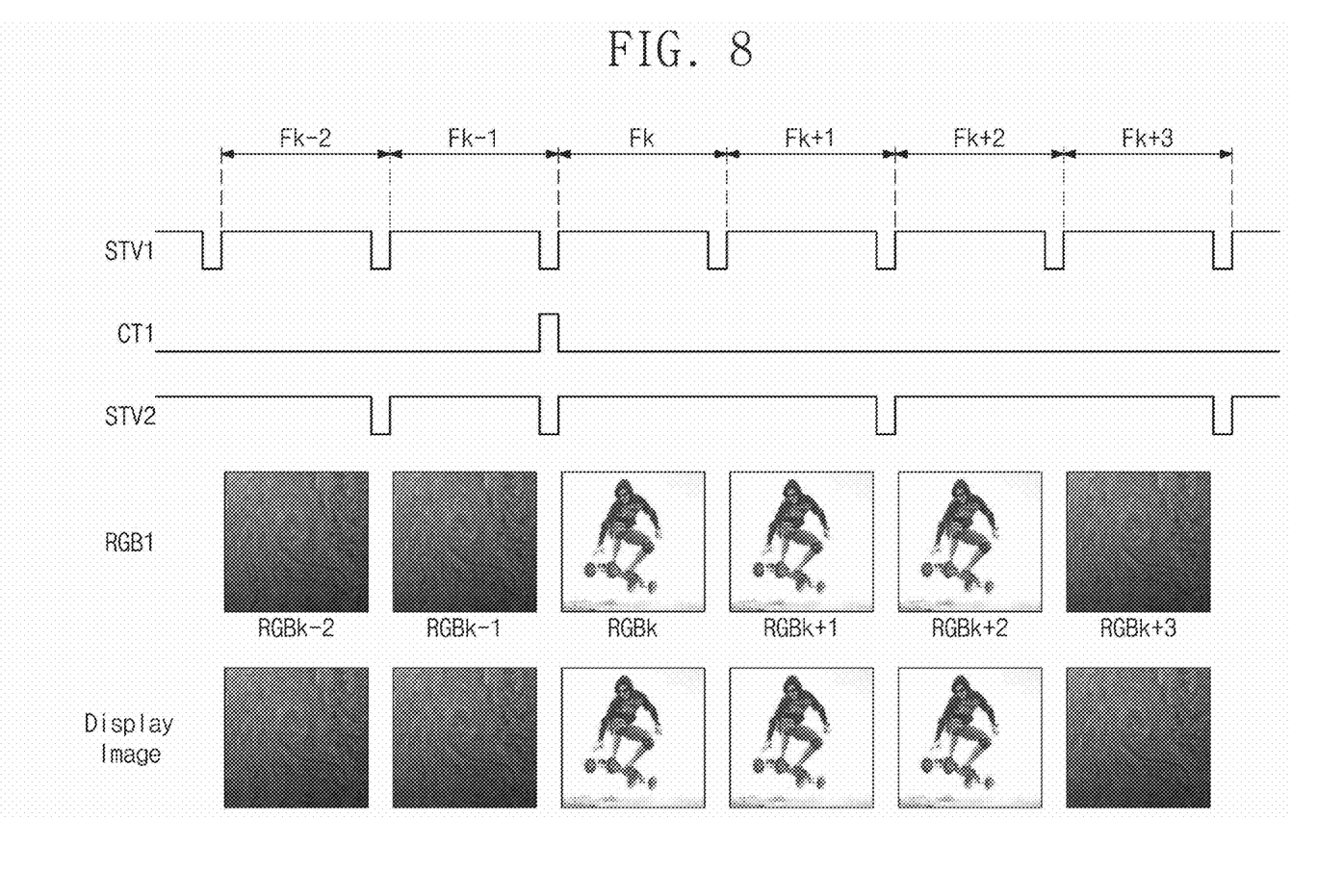
FIG. 8 is a view showing an operation of a display device according to an exemplary embodiment of the inventive concept.

FIG. 8 is a view showing an operation of the display device according to an exemplary embodiment of the inventive concept.

Referring to FIGS. 6 and 8, when the image signal RGBk−1 of the (k−1)th frame Fk−1 is received as the first image signal RGB1, the first controller 321 compares the image signal RGBk−1 of the (k−1)th frame Fk−1 with the second image signal RGB2 of the previous frame stored in the memory 324, e.g., the image signal RGBk−2 of the (k−2)th frame Fk−2. When a difference in brightness between the image signal RGBk−1 of the (k−1)th frame Fk−1 and the image signal RGBk−2 of the (k−2)th frame Fk−2 is smaller than or equal to a reference value, the first controller 321 maintains the start conversion signal CT1 at a second level (e.g., a low level). Meanwhile, the first controller 321 converts the image signal RGBk−1 of the (k−1)th frame Fk−1 to the data signal DATA, outputs the data signal DATA, and stores the image signal RGBk−1 of the (k−1)th frame Fk−1 in the memory 324.

When the image signal RGBk of the k-th frame Fk is received as the first image signal RGB1, the first controller 321 compares the image signal RGBk of the k-th frame Fk with the second image signal RGB2 of the previous frame stored in the memory 324, e.g., the image signal RGBk−1 of the (k−1)th frame Fk−1. When a difference in brightness between the image signal RGBk of the k-th frame Fk and the image signal RGBk−1 of the (k−1)th frame Fk−1 is greater than the reference value, the first controller 321 activates the start conversion signal CT1 at the first level (e.g., the high level) and outputs the start conversion signal CT1 to the second driving circuit 340. Meanwhile, the first controller 321 converts the image signal RGBk of the k-th frame Fk to the data signal DATA, outputs the data signal DATA, and stores the image signal RGBk of the k-th frame Fk in the memory 324.

The second controller 341 of the second driving circuit 340 outputs the second start signal STV2 activated when the start conversion signal CT1 is activated at the first level. Meanwhile, the second controller 341 applies the shutter data signal SDATA and the second control signal CONT2 to the second source driver 342 in response to the first image signal RGB1 and the control signals CTRL, which are received when the start conversion signal CT1 is activated at the first level. Accordingly, the shutter panel 330 is operated to supply the light having the brightness corresponding to the image signal RGBk of the k-th frame Fk. Due to the above-described operation, when the brightness of images of two consecutive frames is suddenly changed (when a difference in brightness between images of two consecutive frames is greater than the reference value), an appropriate light may be provided through the shutter panel 330.

Figure 9:
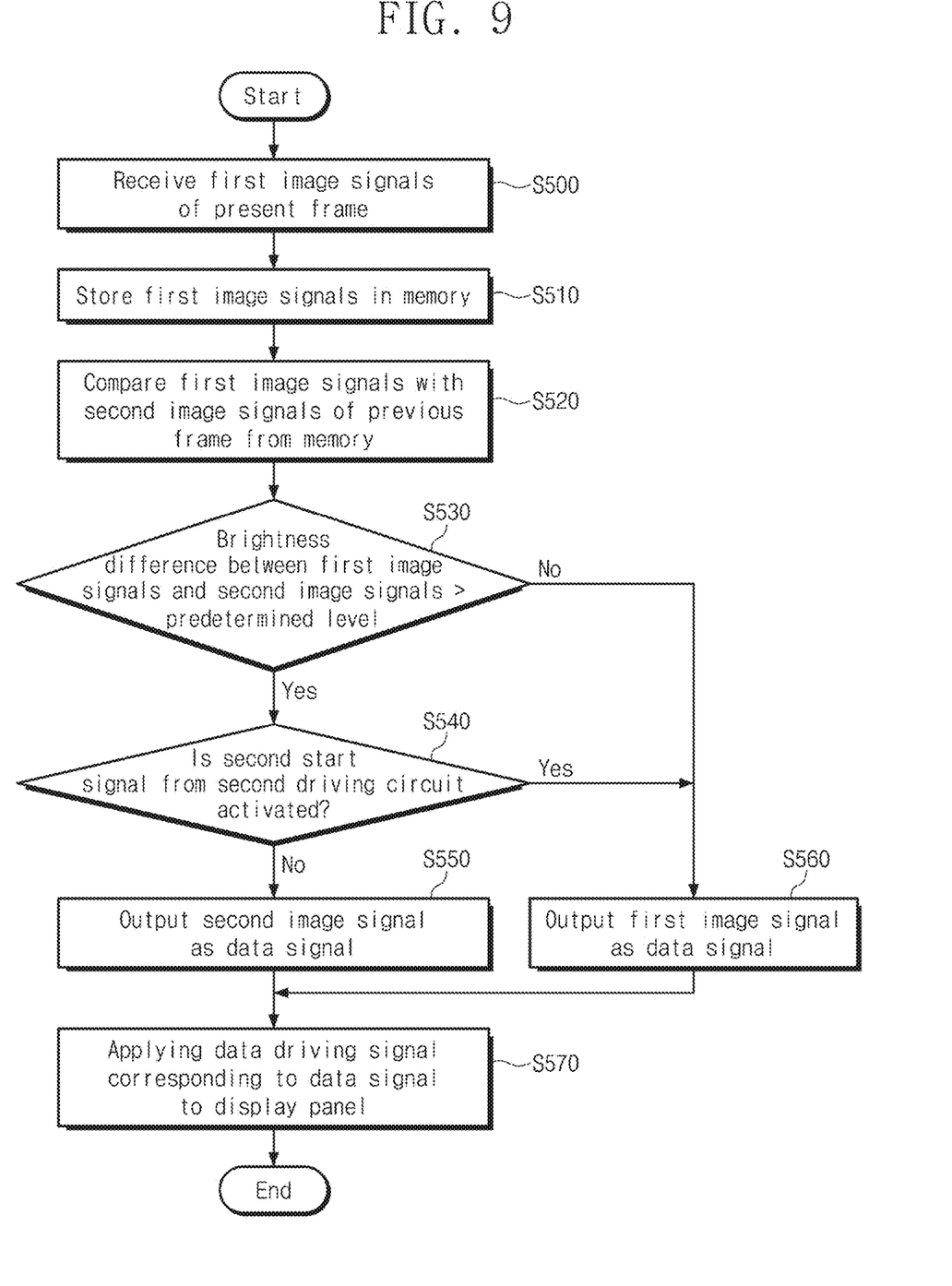
FIG. 9 is a flowchart showing an operation of a display device according to an exemplary embodiment of the inventive concept.

FIG. 9 is a flowchart showing an operation of the display device according to an exemplary embodiment of the inventive concept.

Referring to FIGS. 2 and 9, the first controller 121 of the first driving circuit 120 receives the first image signal RGB1 of the present frame (S500).

The first controller 121 stores the first image signal RGB1 in the memory 124 (S510).

The first controller 121 compares the first image signal RGB1 with the second image signal RGB2 of the previous frame from the memory 124 (S520).

The first controller 121 compares the brightness difference between the first image signal RGB1 and the second image signal RGB2 with the reference value to determine whether the brightness difference between the first image signal RGB1 and the second image signal RGB2 is greater than the reference value (e.g., a predetermined level) (S530).

When the brightness difference between the first image signal RGB1 and the second image signal RGB2 is greater than the predetermined level, the first controller 121 determines whether the second start signal STV2 from the second driving circuit 140 is transited to the active state from the inactive state (S540).

When the brightness difference between the first image signal RGB1 and the second image signal RGB2 is greater than the predetermined level and the second start signal STV2 is in the inactive state, the first controller 121 outputs the second image signal RGB2 as the data signal DATA (S550).

When the brightness difference between the first image signal RGB1 and the second image signal RGB2 is smaller than or equal to the predetermined level and the second start signal STV2 is transited to the active state from the inactive state, the first controller 121 outputs the first image signal RGB1 as the data signal DATA (S560).

The first source driver 122 applies the data driving signal corresponding to the data signal DATA to the display panel 110 (S570).

According to the above, the display device blocks or transmits the light from the backlight unit by the predetermined areas, and thus the contrast ratio and the display quality of the image displayed through the display panel may be improved.

In addition, when the brightness difference between the image signal of the previous frame and the image signal of the present frame is greater than the predetermined level, the first image signal of the present frame is output in synchronization with the second start signal of the shutter panel after the second image signal of the previous frame is output. Accordingly, the display quality of the image may be prevented from deteriorating due to the difference in operation frequency between the shutter panel and the display panel.

Although the inventive concept has been shown and described with reference to exemplary embodiments thereof, it is to be understood by those of ordinary skill in the art that various changes and modifications in form and details may be made thereto without departing from the spirit and scope of the inventive concept as set forth by the following claims.

What is claimed is:

1. A display device comprising:
   a display panel comprising a plurality of pixels;
   a first driving circuit configured to operate to display an image through the plurality of pixels; and
   a shutter panel comprising a plurality of shutter pixels and configured to be periodically refreshed,
   wherein the first driving circuit is operated to display a second image corresponding to a second image signal through the display panel when a difference in brightness between a first image signal of a present frame and the second image signal of a previous frame is greater than a predetermined level and to display a first image corresponding to the first image signal through the display panel when the shutter panel is refreshed.

2. The display device of claim 1, wherein the first driving circuit comprises a memory configured to store the first image signal of the present frame from an outside and output the second image signal of the previous frame.

3. The display device of claim 2, wherein the first driving circuit further comprises:
   a first controller configured to receive the first image signal of the present frame and a control signal, and compare the first image signal with the second image signal of the previous frame from the memory to output a data signal, a first control signal, and a first start signal;
   a first source driver configured to output a data driving signal in response to the data signal and the first control signal; and
   a first gate driver configured to sequentially select the plurality of pixels in response to the first start signal.

4. The display device of claim 3, wherein the first controller comprises an image signal processing circuit configured to convert the second image signal from the memory to the data signal when the difference in brightness between the first image signal of the present frame and the second image signal of the previous frame is greater than the predetermined level, and convert the first image signal of the present frame to the data signal when the shutter panel is refreshed.

5. The display device of claim 4, further comprising a second driving circuit configured to receive the first image signal and the control signal, and output a second start signal to drive the shutter pixels,
   wherein, when the difference in brightness between the first image signal of the present frame and the second image signal of the previous frame is greater than the predetermined level, the image signal processing circuit converts the second image signal from the memory to the data signal, and
   the image signal processing circuit converts the first image signal of the present frame to the data signal in synchronization with the second start signal.

6. The display device of claim 5, wherein the second start signal has a frequency lower than a frequency of the first start signal.

7. The display device of claim 5, wherein the second driving circuit further comprises:
   a second controller configured to receive the first image signal and the control signal and output a second control signal and the second start signal;

a second source driver configured to output a shutter data signal to the plurality of shutter pixels in response to the second control signal; and a second gate driver configured to sequentially select the plurality of shutter pixels in response to the second start signal.

8. The display device of claim 1, wherein a number of the plurality of shutter pixels of the shutter panel is smaller than a number of the plurality of pixels of the display panel.

9. The display device of claim 1, wherein the display panel comprises:
   a first substrate comprising a plurality of pixel areas respectively corresponding to the plurality of pixels;
   a second substrate spaced apart from and parallel to the first substrate and comprising the plurality of pixel areas;
   a liquid crystal layer disposed between the first substrate and the second substrate;
   a first polarizer disposed on a lower surface of the first substrate, wherein the first substrate is between the first polarizer and the second substrate; and
   a second polarizer disposed on an upper surface of the second substrate, wherein the second substrate is between the second polarizer and the first substrate.

10. The display device of claim 9, wherein the shutter panel comprises:
    a third substrate;
    a fourth substrate spaced apart from and parallel to the third substrate;
    a shutter liquid crystal layer disposed between the third substrate and the fourth substrate; and
    a third polarizer disposed on a lower surface of the fourth substrate, wherein the fourth substrate is between the third polarizer and the third substrate.

11. The display device of claim 10, wherein the shutter panel further comprises an adhesive layer adhered to the first substrate of the display panel.

12. The display device of claim 10, further comprising a first electrode and a second electrode, wherein the first and second electrodes are disposed between the fourth substrate of the shutter panel and the shutter liquid crystal layer.

13. The display device of claim 1, further comprising a backlight unit configured to supply a light to the display panel.

14. A display device comprising:
    a display panel comprising a plurality of pixels;
    a first driving circuit configured to receive a first image signal of a present frame and a control signal, and control an image to be displayed through the plurality of pixels; and
    a shutter panel comprising a plurality of shutter pixels and configured to be periodically refreshed,
    wherein the first driving circuit controls the shutter panel to be refreshed when a difference in brightness between the first image signal of the present frame and a second image signal of a previous frame is greater than a predetermined level.

15. The display device of claim 14, wherein the first driving circuit comprises a memory configured to store the first image signal of the present frame and output the second image signal of the previous frame.

16. The display device of claim 14, further comprising a second driving circuit configured to receive the first image signal and the control signal and output a second start signal to drive the plurality of shutter pixels,
    wherein, when the difference in brightness between the first image signal of the present frame and the second image signal of the previous frame is greater than the predetermined level, the first driving circuit activates a start conversion signal, and
    the second driving circuit activates the second start signal in response to the start conversion signal.

17. The display device of claim 14, further comprising a backlight unit configured to supply a light to the display panel.

18. A method of operating a display device comprising a first driving circuit for controlling a display panel and a second driving circuit for controlling a shutter panel, comprising:
    receiving, by the first driving circuit, a first image signal of a present frame;
    storing, by the first driving circuit, the first image signal in a memory;
    comparing, by the first driving circuit, the first image signal with a second image signal of a previous frame from the memory; and
    outputting, by the first driving circuit, the second image signal as a data signal when a difference in brightness between the first image signal and the second image signal is greater than a predetermined level and the first image signal as the data signal when the shutter panel is refreshed.

19. The method of claim 18, further comprising:
    outputting, by the first driving circuit, the first image signal as the data signal when the difference in brightness between the first image signal and the second image signal is smaller than or equal to the predetermined level.

20. The method of claim 18, wherein the second driving circuit receives the first image signal and a control signal and outputs a start signal to drive a plurality of shutter pixels, and
    outputting the data signal comprises outputting the first image signal as the data signal in response to the start signal when the difference in brightness between the first image signal and the second image signal is greater than the predetermined level.

* * * * *